Jan. 18, 1938.  G. S. BOYLER  2,105,716
LOCOMOTIVE DRAFT CHAMBER
Filed Nov. 2, 1936  8 Sheets-Sheet 1

INVENTOR
G.S.BOYLER.
BY
ATTYS

Jan. 18, 1938.  G. S. BOYLER  2,105,716
LOCOMOTIVE DRAFT CHAMBER
Filed Nov. 2, 1936    8 Sheets-Sheet 2
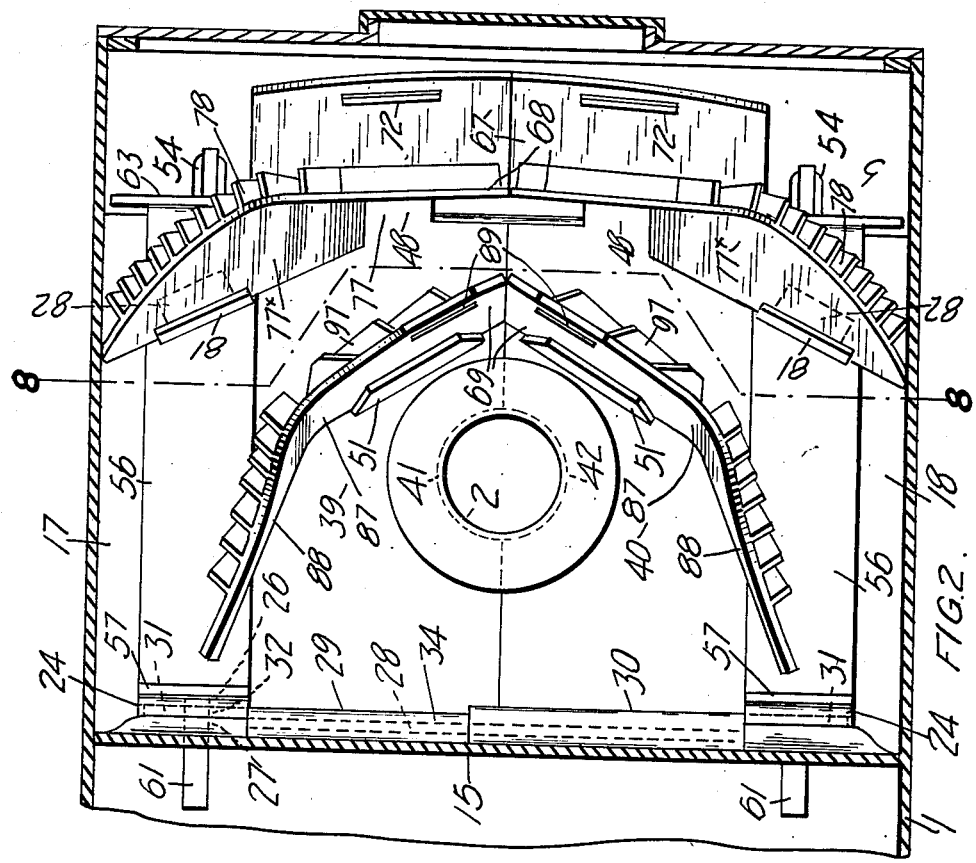
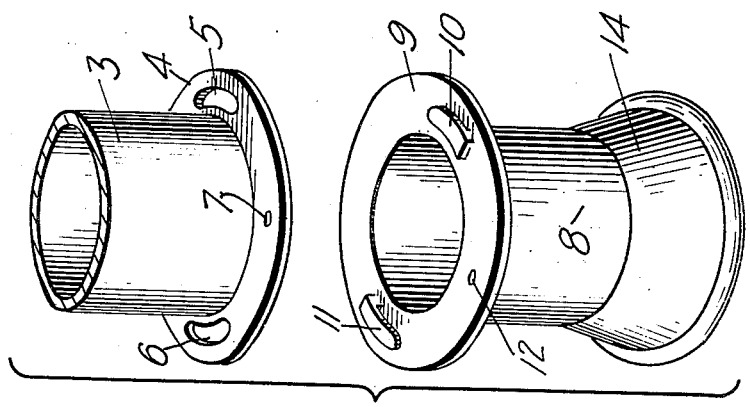
INVENTOR
G. S. BOYLER
BY
ATTYS.

Jan. 18, 1938.　　　　G. S. BOYLER　　　　2,105,716
LOCOMOTIVE DRAFT CHAMBER
Filed Nov. 2, 1936　　　　8 Sheets-Sheet 3
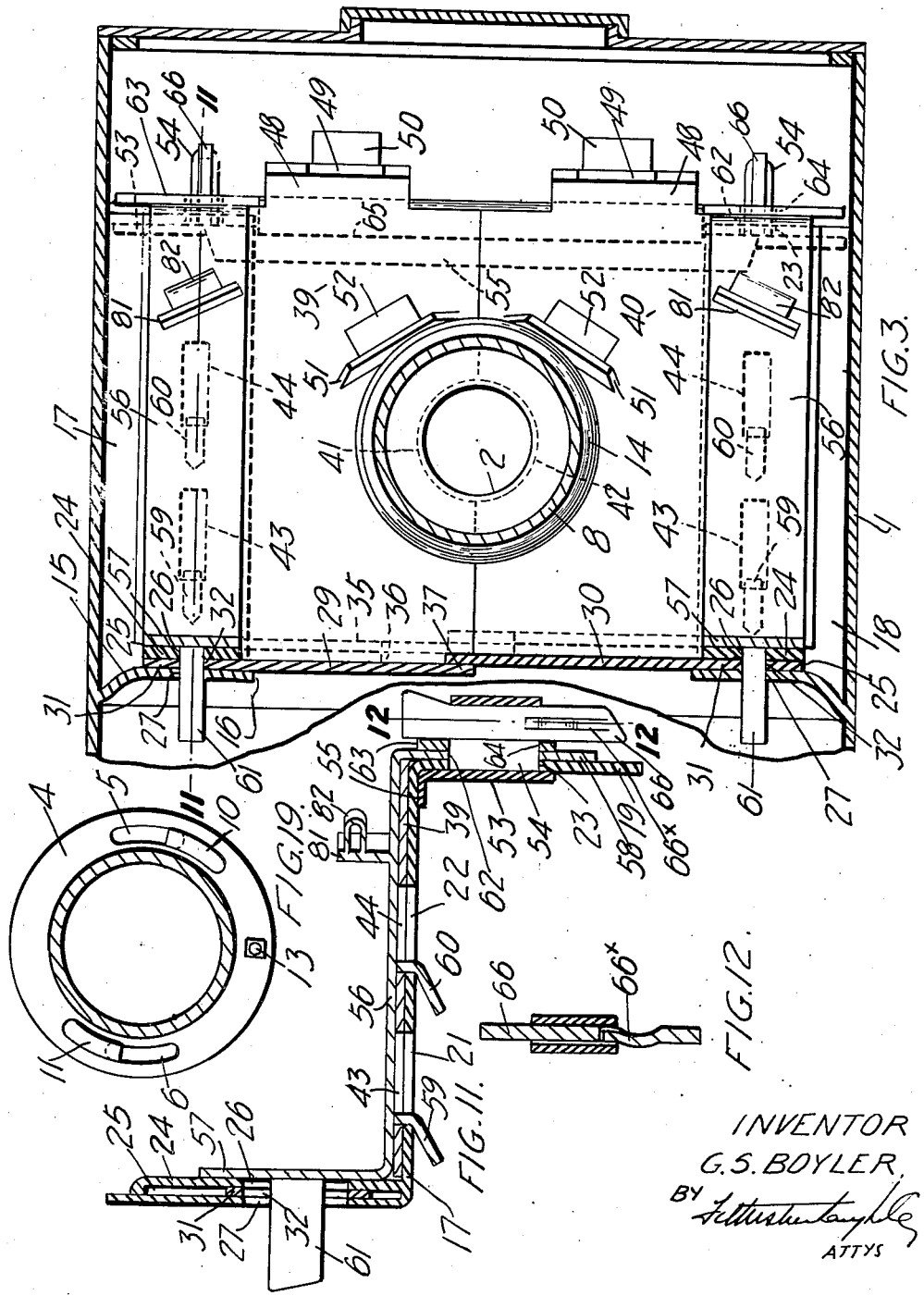
INVENTOR
G.S. BOYLER,
BY
ATTYS Jan. 18, 1938.    G. S. BOYLER    2,105,716
LOCOMOTIVE DRAFT CHAMBER
Filed Nov. 2, 1936    8 Sheets-Sheet 4

INVENTOR
G. S. BOYLER
BY
ATTYS.

Jan. 18, 1938.   G. S. BOYLER   2,105,716
LOCOMOTIVE DRAFT CHAMBER
Filed Nov. 2, 1936   8 Sheets-Sheet 5

INVENTOR
G.S.BOYLER
BY
ATTYS.

Jan. 18, 1938.   G. S. BOYLER   2,105,716
LOCOMOTIVE DRAFT CHAMBER
Filed Nov. 2, 1936   8 Sheets-Sheet 6

INVENTOR
G.S.BOYLER
BY *[signature]*
ATTYS.

Jan. 18, 1938.                G. S. BOYLER                2,105,716
                       LOCOMOTIVE DRAFT CHAMBER
                        Filed Nov. 2, 1936            8 Sheets-Sheet 7

INVENTOR
G. S. BOYLER
ATTYS.

Jan. 18, 1938.   G. S. BOYLER   2,105,716
LOCOMOTIVE DRAFT CHAMBER
Filed Nov. 2, 1936   8 Sheets—Sheet 8
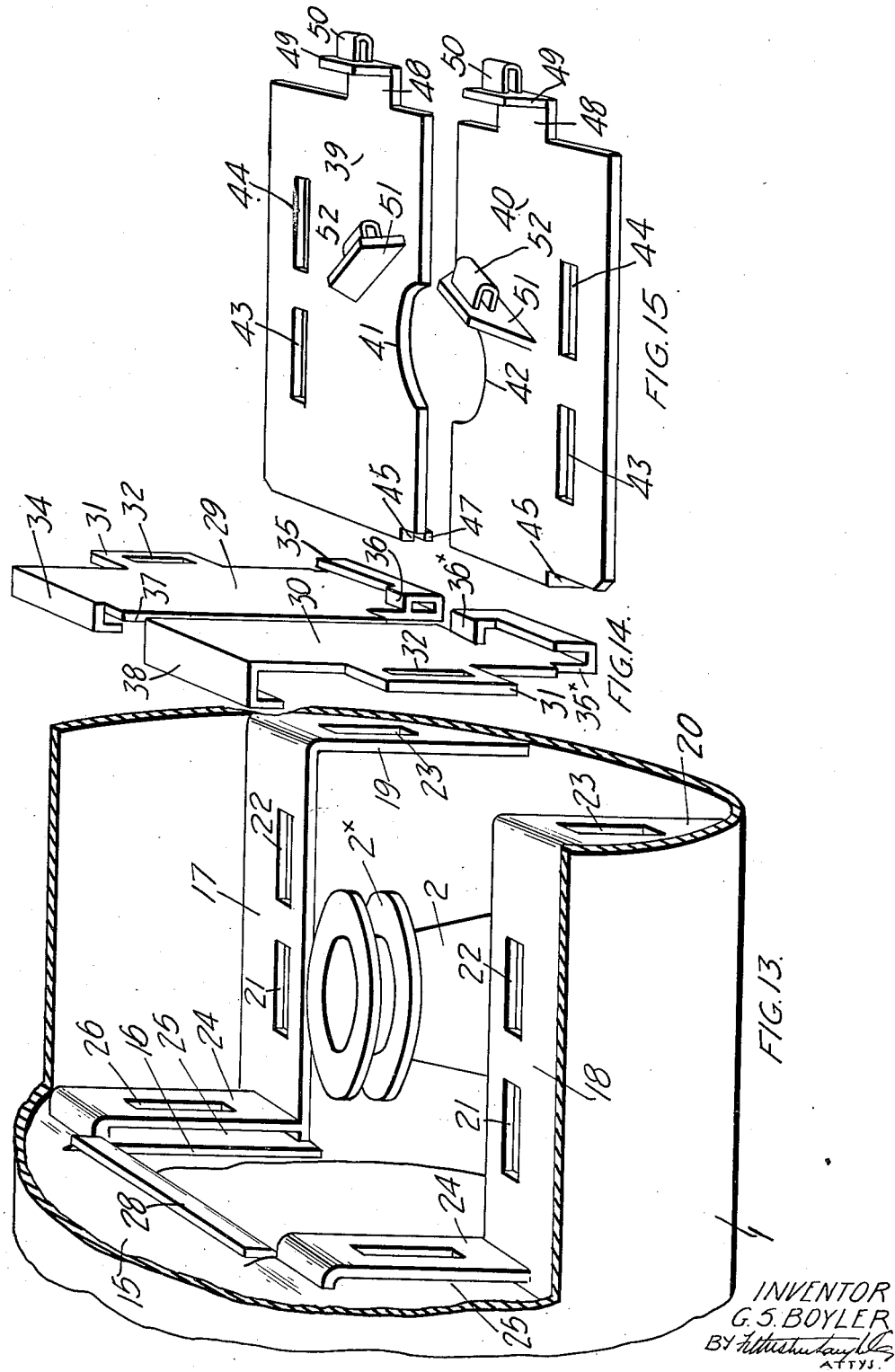
INVENTOR
G. S. BOYLER Patented Jan. 18, 1938

2,105,716

UNITED STATES PATENT OFFICE 2,105,716

LOCOMOTIVE DRAFT CHAMBER

George Samuel Boyler, Peterborough, Ontario, Canada

Application November 2, 1936, Serial No. 108,736

4 Claims. (Cl. 110—122)

My invention relates to improvements in locomotive draft chambers, and the object of the invention is to provide a construction of chamber which may be easily and quickly assembled or disassembled thereby greatly economizing time, labour and cost of repair to this part of the locomotive and yet provide a structure which is rigid, tight fitting and strong, in which mesh screen liable to clog with fine cinder particles is dispensed with, in which there is a clear unobstructed draft passage for the smoke and by which the hot cinders are broken up into very fine particles quickly losing their heat before passing out of the smoke stack, and it consists essentially in the arrangement and construction of parts all as hereinafter more particularly explained.

Fig. 2 is a plan section on line 2—2 Fig. 1 showing the baffle plates in full.

Fig. 3 is a similar view to Fig. 2 with the baffle plates removed.

Fig. 11 is a sectional view on line 11—11 Fig. 3.

Fig. 12 is a sectional detail on line 12—12 Fig. 11.

Fig. 13 is a perspective view of the draft chamber with all the movable parts removed.

Fig. 14 is a perspective view of the vertical removable dead plates separated apart.

Fig. 15 is a perspective view of the horizontal removable dead plates separated apart.

Fig. 18 is an enlarged perspective detail of the petticoat pipe and the lower portion of the stack separated apart and showing the detachable connection therebetween.

Fig. 19 is a sectional plan detail of the smoke stack and its connections.

In the drawings like characters of reference indicate corresponding parts in each figure.

Figure 1:
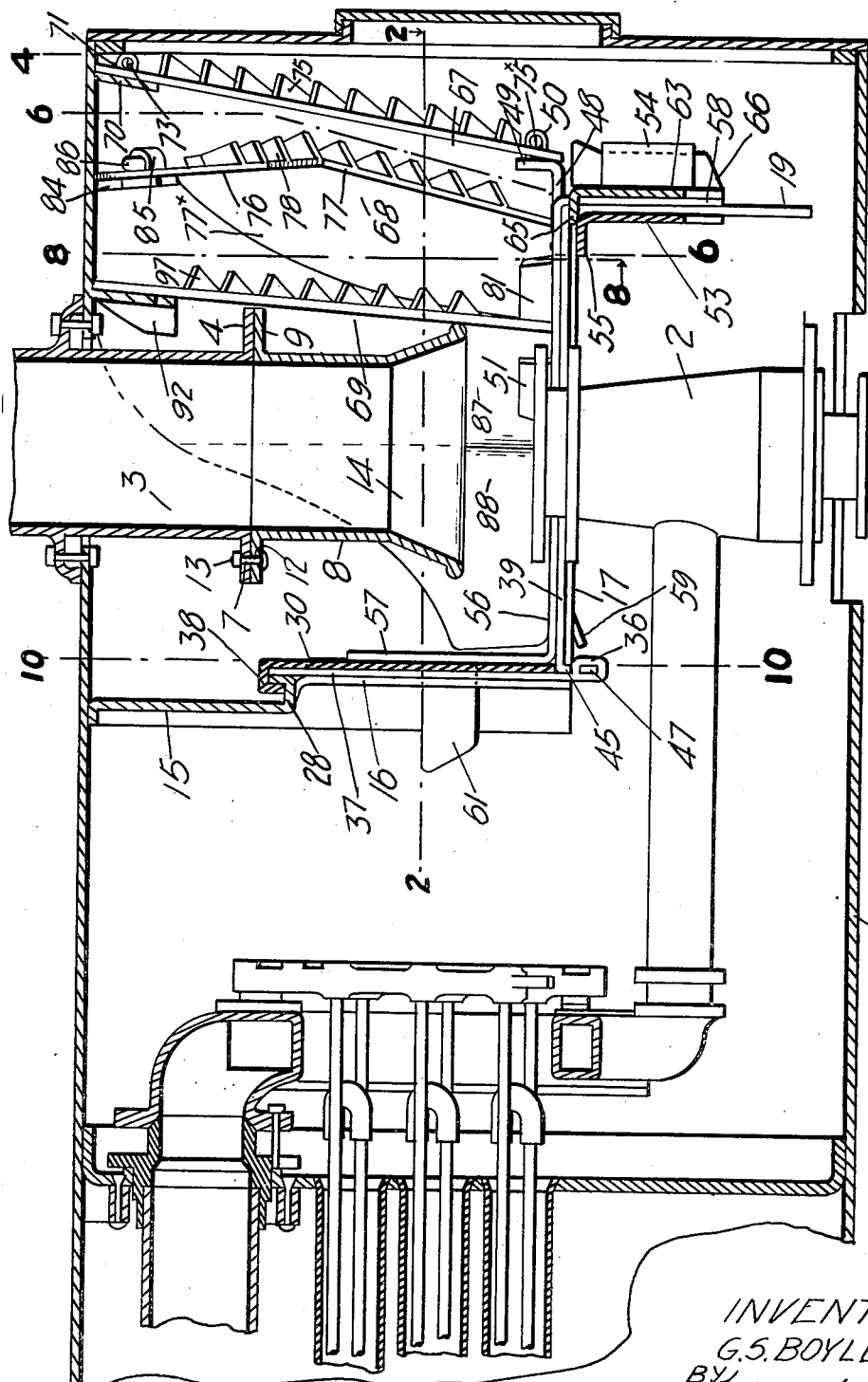
Fig. 1 is a longitudinal sectional view through a portion of a locomotive and my draft chamber.

1 indicates the body of the locomotive provided with the usual exhaust nozzle 2. 3 indicates the smoke stack beneath which the exhaust nozzle 2 is located in vertical axial alignment according to the usual practice. The lower end of the smoke stack is provided with an annular surrounding flange 4 in which are located diametrically opposite concentric slots 5 and 6 and a small orifice 7.

8 indicates a stack extension provided at its upper end with an annular flange 9 opposing the flange 4 and provided with hook fingers 10 and 11 designed to pass through the slots 5 and 6 when the flanges 4 and 9 are brought into contact and when the extension 8 is turned concentrically to engage the opposite ends of the slots to connect the parts together as indicated in Fig. 19. 12 is an orifice formed in the flange 9 which, by the turning of the extension 8, is brought into a line with the orifice 7 so that a bolt 13 may pass therethrough to positively secure the stack 3 and extension 8 together. The lower end of the extension 8 is provided with a flaring portion or petticoat 14.

15 is a stationary dead plate extending transversely of the locomotive body and forming the rear wall of the draft chamber or smoke box. The lower edge of the vertical portion of the dead plate 15 extends slightly below the horizontal centre of the locomotive body and is formed with a rectangular central opening 16 extending upward from such lower edge. At each side of the opening 16 the dead plate is provided with horizontal extensions 17 and 18 terminating in depending portions 19 and 20.

The portions 17 and 18 are each provided with aligned slots 21 and 22 and the extensions 19 and 20 each with a vertical slot 23 disposed in the same vertical plane as the slots 21 and 22. The portions 17, 18, 19 and 20 together with the dead plate 15 are secured to the interior of the boiler body so as to form an integral part thereof. The exhaust nozzle projects up centrally between the portions 17 and 18 and is provided with an annular flange 2× adjacent its upper end.

Integral with the dead plate 15 and the portions 17 and 18 are vertical strap portions 24 spaced from the dead plate to form slotted openings 25 for a purpose which will hereinafter appear. Each portion 24 is provided with a vertical slot 26 located in the same vertical plane as the slots 21 and 22 and in longitudinal alignment with vertical slots 27 in the dead plate 15 (see Fig. 11).

The upper edge of the opening 16 is provided with an up-turned hooked lip 28.

29 and 30 are removable vertical dead plates each provided with a laterally outwardly extending lug 31 adapted to enter the slotted openings 26 and provided with vertical slots 32 adapted to register on one side with the slots 26 and on the opposite side with slots 27 formed in the dead plate 15.

The upper edge of the dead plate 29 is provided with a rearwardly hooked portion 34 engaging the hooked lip 28 of the dead plate 15 at one side of the centre line thereof and at its lower edge with a forwardly hooked portion 35 terminating at its inner end in a closed loop 36. The inner vertical edge of the dead plate 29 is provided with a tongue extension 37.

The dead plate 30 is provided at its upper edge with a hooked portion 38 which is wider than the hook portion 34 to enable of the dead plate 30 overlapping the tongue extension 37 and yet fit into the up-turned lip 28 at the opposite side of the dead plate opening 16. At its lower edge the dead plate 30 is provided with a forwardly hooked portion 35× terminating at its inner end in a closed loop 36×.

39 and 40 are horizontal dead plates resting at their outer edges on the stationary dead plate portion 17 and 18 and having in their inner edges semi-circular opposing recesses 41 and 42 to allow the dead plates 39 and 40 to fit around the exhaust nozzle 2 and rest on the annular flange 2× thereof. Adjacent the outer edges of the dead plates 39 and 40 are longitudinal slots 43 and 44 which, when the parts are assembled, register with the slots 21 and 22.

Figure 10:
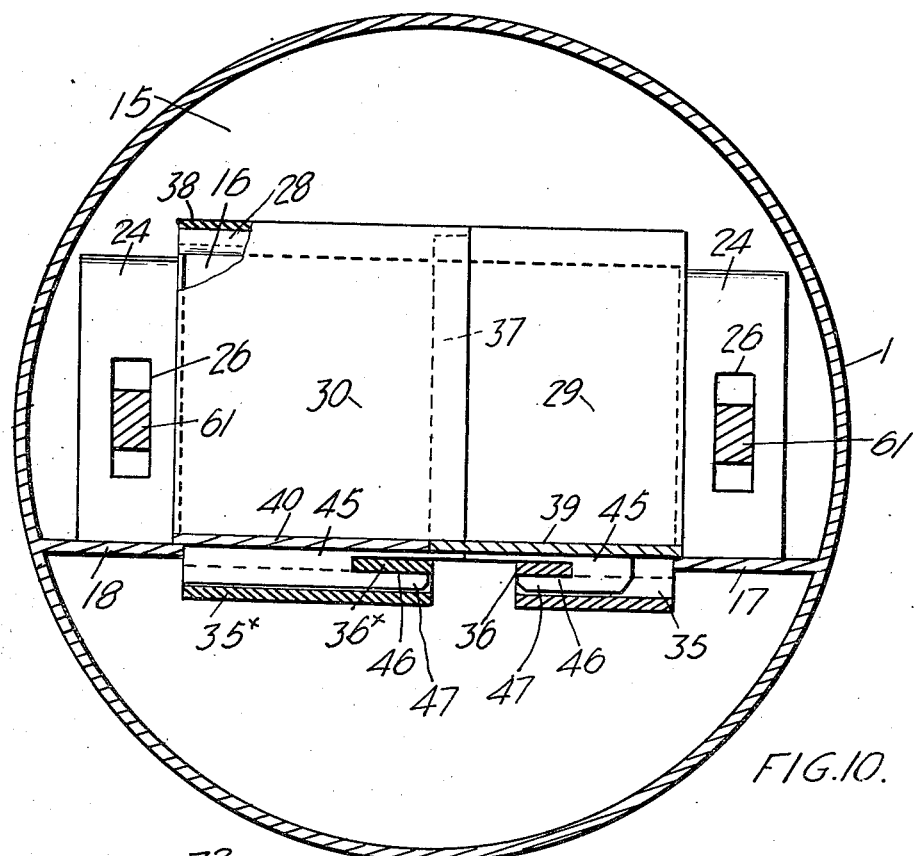
Fig. 10 is a sectional view on line 10—10 Fig. 1.
Figure 5:
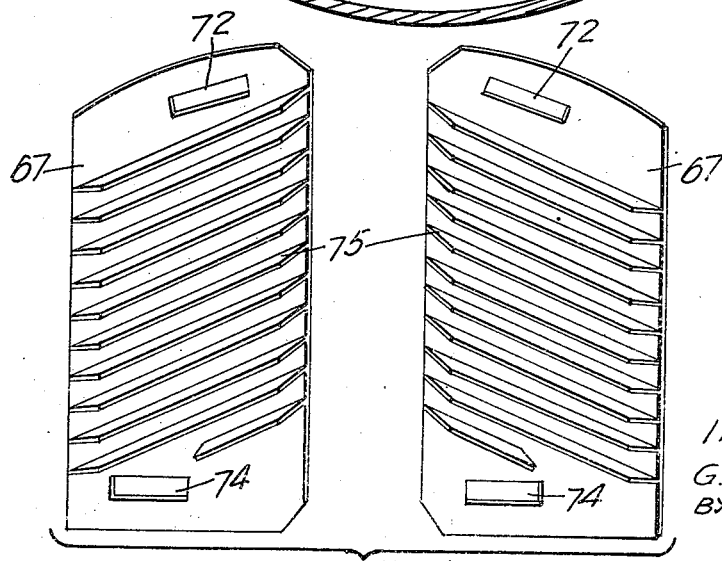
Fig. 5 is a view of the front baffle plates shown in perspective and separated apart.
Figure 6:
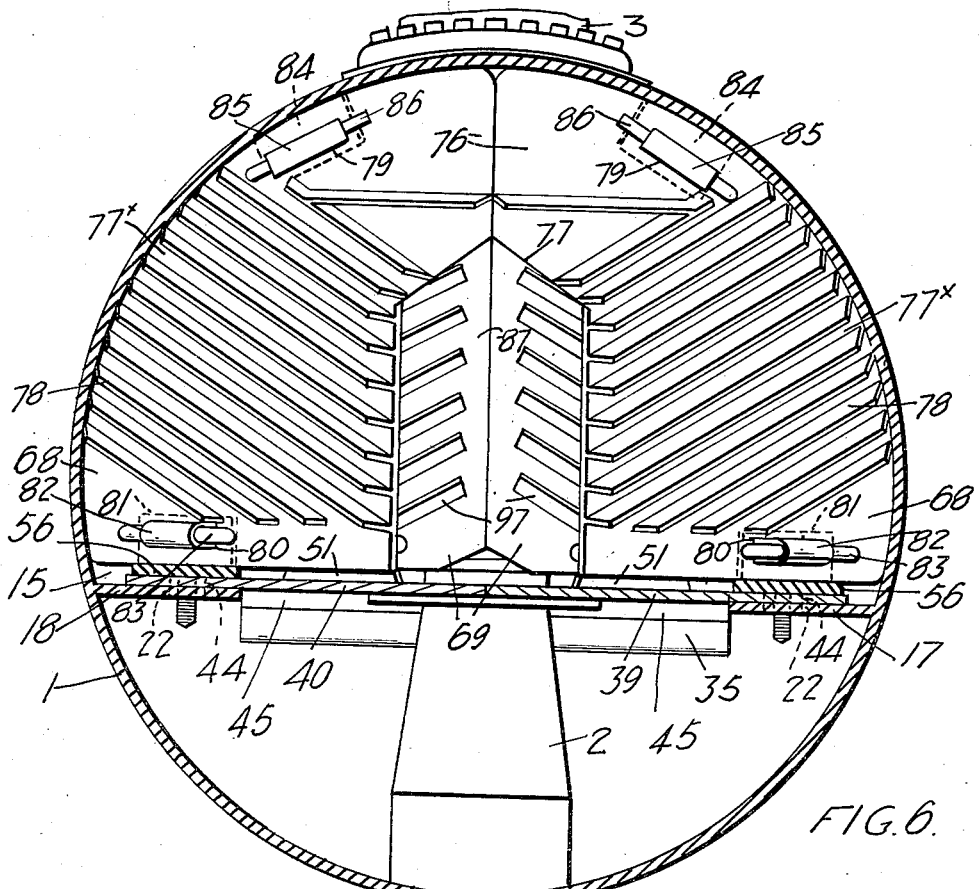
Fig. 6 is a sectional view on line 6—6 Fig. 1 showing the intermediate baffle plates in full.
Figure 7:
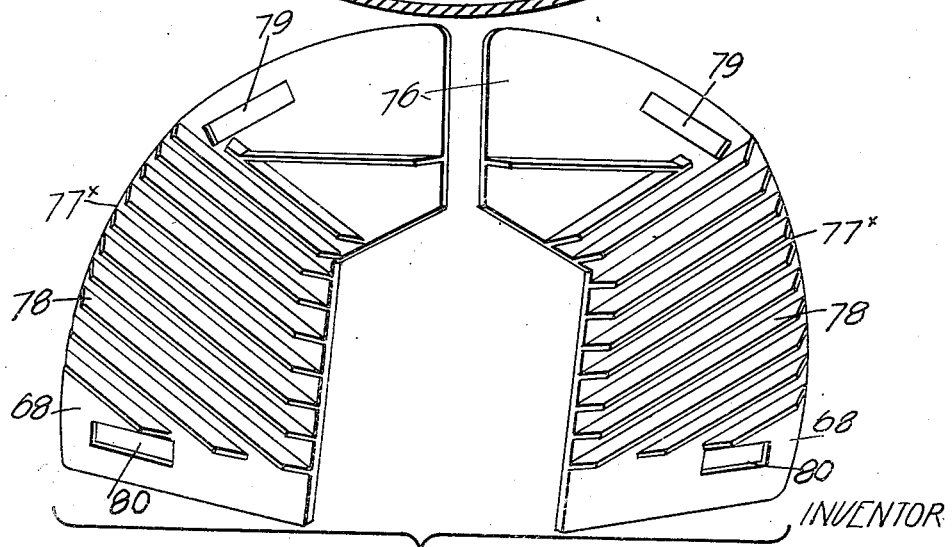
Fig. 7 is a view of the intermediate baffle plates shown in perspective and separated apart.
Figure 8:
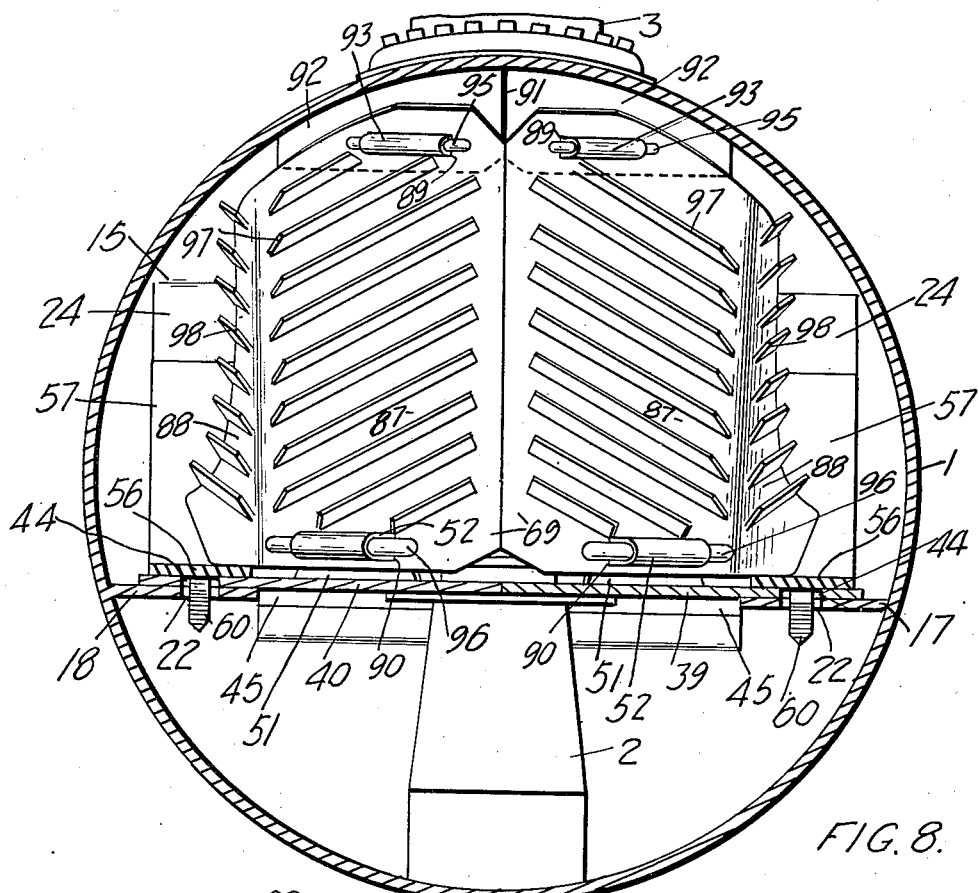
Fig. 8 is a sectional view on line 8—8 Figs. 1 and 2.
Figure 9:
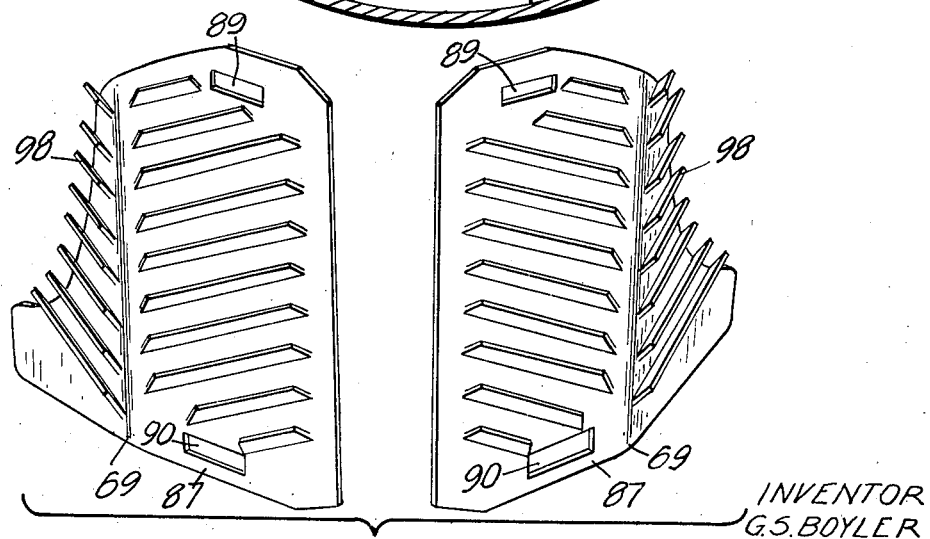
Fig. 9 is a view of the rear baffle plates shown in perspective and separated apart.

The rear edge of each dead plate 39 and 40 is provided with a down-turned flange 45 fitting into the portions 35 and 35× of the vertical dead plates 29. The flanges 45 are slotted at 46 to form hook portions 47 engaging the loops 36 and 36× as clearly indicated in Fig. 10. The forward edges of the dead plates 39 and 40 are each provided with lug extensions 48 having upturned ends 49 provided with key holding loops 50. From the upper face of the dead plates 39 and 40 extend lugs 51 set at an angle and provided with key holding loops 52.

Beneath the stationary dead plate portions 17 and 18 and in contact with the vertical portions 19 and 20 extends a transverse bar 53 having key loops 54 extending through the vertical slots 23 to protrude therefrom. The upper edge of the plate 53 is provided with a rearwardly extending lip 55 contacting with the lower faces of the dead plates 39 and 40.

Holding bars 56 extend over the slotted portions of the dead plates 39 and 40 carried on the stationary dead plate portions 17 and 18 and have up-turned rear ends 57 and down-turned forward ends 58 and hook portions 59 and 60 extending through the aligned slots 43 and 21, and 44 and 22. The up-turned rear portion 57 is provided with a projection 61 extending through the aligned slots 26, 32 and 27. The down-turned portions 58 are provided with vertical slots 62 in alignment with the slots 23 and through which the key loops 54 extend.

Figure 4:
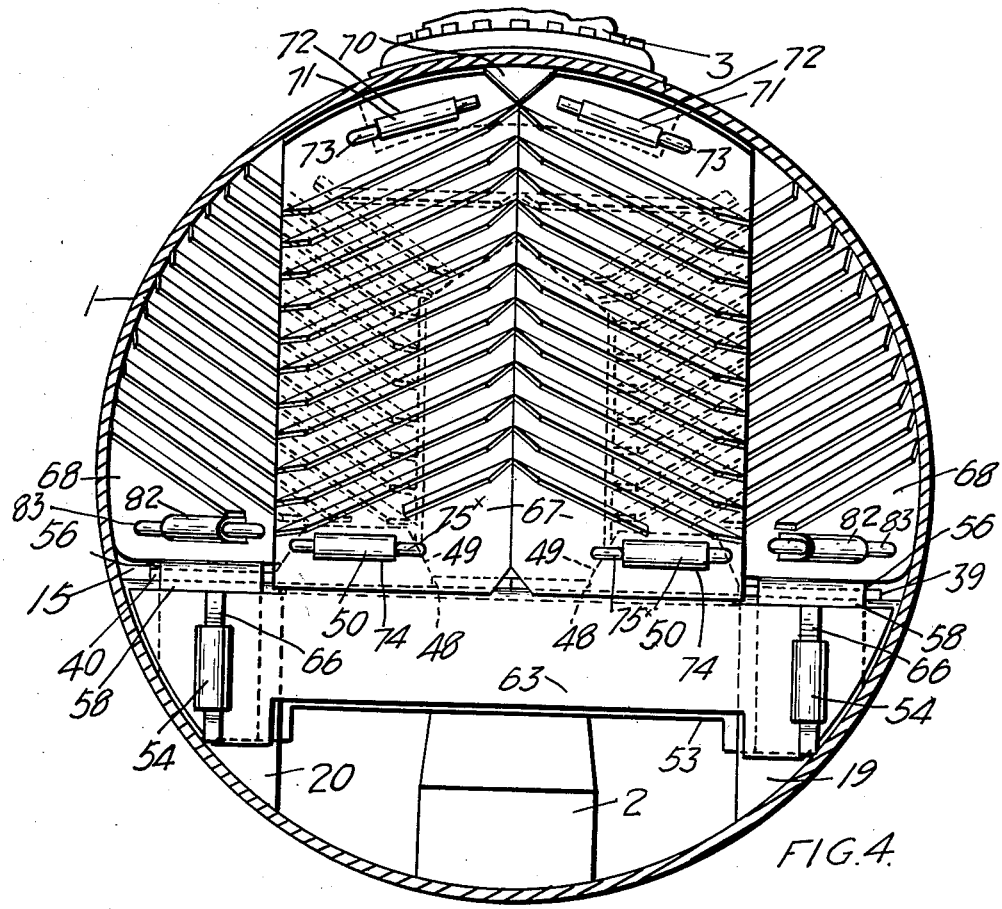
Fig. 4 is a cross sectional view on line 4—4 Fig. 1.
Figures 16, 17:
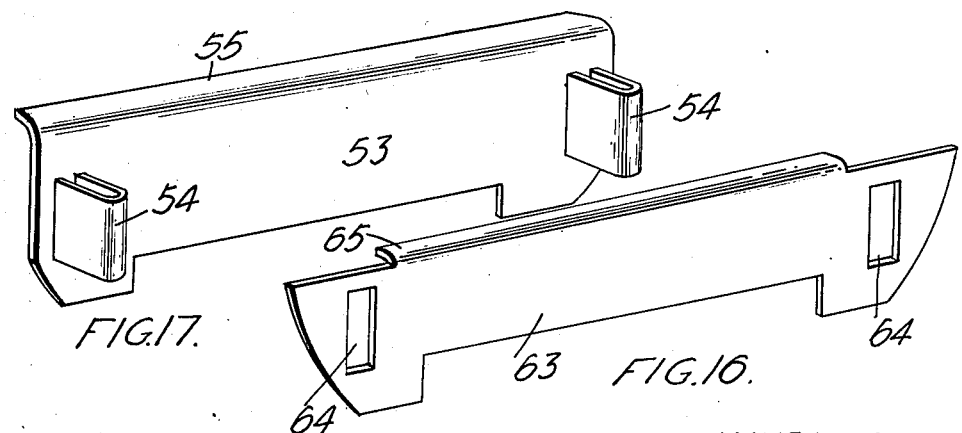
Fig. 16 is a perspective detail of the front transverse plate or apron.
Fig. 17 is a perspective detail of the rear transverse plate or apron.

63 is an outer transverse plate having slots 64 through which the key loops 54 also extend. The upper edge of the plate 63 is provided with a rearwardly extending lip 65 overlying the lipped upper edge 55 of the plate 53. When the plates 53 and 63 and bars 56 are placed in position, they are secured by the keys 66 extending through the key loops 54 as clearly shown in Figs. 4 and 11.

67, 68 and 69 are respectively the front, intermediate and rear baffle plates. Each of these plates are arranged in pairs, a plate being located at each side of the centre line of the draft chamber. The front baffle plates 67 are flat plates meeting at the centre line of the draft chamber and extending laterally to a point adjacent the inner edge of each stationary dead plate portion 17 and 18 to allow for the rearward passage of the smoke. The upper edges of these plates are curved concentric to the interior periphery of the locomotive body and fit at such edges against a flange 70 depending from the top of the locomotive and provided with key loops 71 extending through slots 72 adjacent the upper edge of each plate and 73 are keys extending through the loops 71. The lower ends of the plates are provided with slots 74 through which the loops 50 pass extending from the lug 49 to receive the keys 75×. The plates 67 are provided with parallel vanes 75 inclining downwardly from the centre line of the draft to the outer edge of the plate.

The intermediate plates 68 fit at their upper edge the interior periphery of the smoke chamber, the upper portion of each plate extending inwardly as indicated at 76 to form a central opening 77 for the rearward passage of the smoke. The lower portions 77× incline slightly rearward towards their outer edges, such portions being provided with downwardly and inwardly inclined vanes 78.

Each intermediate plate 68 is provided with upper and lower slots 79 and 80. 81 are lugs extending in an inwardly and in a forwardly inclined direction across the holding bars 56 and from which extend key receiving loops 82 extending through the lower slots 80 of the plates 68 and secured therein by a key 83. 84 are lugs depending from the upper portion of the locomotive body at each side of the centre thereof and from which extend key receiving loops 85 through the upper slots 79 being secured therein by the keys 86.

The rear baffle plates 69 each comprises rearwardly inclined portions 87 which meet at the centre line of the draft chamber and extend adjacent to the securing bars 56 and a plate portion 88 extending from each portion 87 at a slightly sharper angle. The upper edge of the extension 88 is curved downwardly to form an opening for the inward passage of the smoke which then passes to the stack 3. Each plate 69 is provided with upper and lower slots 89 and 90. 91 is a broad V-shaped flange depending from the top of the locomotive body, the apex of which is located on the centre line of the body, the arms 92 of the V extending rearwardly. From each arm 92 extends a key receiving sleeve 93 passing through a slot 89 of a plate 69 and secured by the key 95. Each plate 69 is provided with two sets of vanes 97 and 98. The vanes 97 incline downwardly from the inner edge of the plate portion 87 towards the opposite edge of such portion and vanes 98 extending from the extension 88 extending rearwardly in an upwardly inclined direction.

The key receiving sleeves 52 previously described extend through the lower slots 90 and are secured therein by the keys 96.

If desired a form of self-locking key may be used as indicated in Fig. 12 in which the key 66 is provided with a spring tongue 66× which is convexed outwardly so that when the key is driven the tongue 66× is compressed inwardly to permit the key passing to its locking position as indicated in Fig. 12.

In operation smoke passes forward beneath the plates 53 and 63 then upward against the front faces of the plates 67. The smoke and any live cinders carried in the smoke impinge on the vanes 75 and are directed laterally outward to pass around the outer upwardly extending edges of the plates 67 to impinge on the vanes 78 of the plates 68 being directed inwardly by such vanes to pass through the central openings 77 to be carried against the vanes 97 and 98 as the smoke passes around the front face of the plate 69 to pass over the curved edges 88 to the stack 3.

As the live cinders in the smoke impinge successively against the vanes 75, 78, 97 and 98, the cinders are broken up into fine particles which rapidly lose their heat and become dead as they pass out of the smoke stack.

Although I have shown the vanes 75, 78, 97 and 98 extending only from the front face of the plates 67, 68 and 69 similar vanes, if found desirable, may be placed on the rear faces of these plates.

In disassembling my device, the keys 66 are first removed permitting the removal of the plates 63 and 53. The keys 73 and 75× are then withdrawn permitting the removal of the front plates 67. Similarly by the withdrawal of the keys 83 and 86 the intermediate plate 68 may be removed and by the withdrawal of the keys 95 and 96 the rear plate 69 may be removed.

After the baffle plates 67, 68 and 69 are removed the bolt 13 is withdrawn and the stack extension turned to disengage the hooks 10 and 11 from the slots 5 and 6.

When the stack extension 8 is removed, the bars 56 are withdrawn allowing the horizontal dead plates 39 and 40 to be lifted and removed, the hooks 47 thereof being disengaged laterally.

The vertical dead plates 29 and 30 may then be disengaged from the hook lip 28 and the lug portions 31 withdrawn from the slotted openings 25.

The interior of the locomotive may then be readily gotten at for repair.

What I claim as my invention is:—

1. The combination with the locomotive body and the stack, of a vertical wall located at the rear of the stack and having a rectangular central opening extending upward from its lower edge to a point intermediate of its height, horizontal wall portions extending forward from such lower edge at each side of the opening, a vertical plate extending between and overlapping the sides of such opening, a horizontal plate extending between and overlapping the horizontal wall portions, a removable bar plate overlying each overlapping vertical and horizontal plate portion means for tying each horizontal wall portion, the corresponding overlapping plate portion and overlying bar plate together, and means for tying each vertical wall portion, corresponding overlapping plate portion and overlying bar plate together.

2. The combination with the locomotive body and the stack, of a vertical wall located at the rear of the stack and having a rectangular central opening extending upward from its lower edge to a point intermediate of its height, horizontal wall portions extending forward from such lower edge at each side of the opening, a vertical plate extending between and overlapping the sides of such opening, a horizontal plate extending between and overlapping the horizontal wall portions, a removable bar plate overlying each overlapping vertical and horizontal plate portion, means for tying each horizontal wall portion, the corresponding overlapping plate portion and overlying bar plate together, means for tying each vertical wall portion corresponding overlapping plate portion and overlying bar plate together, and means for tying the forward ends of the bar plates together.

3. The combination with the locomotive body and the stack, of a vertical wall located at the rear of the stack and having a rectangular central opening extending upward from its lower edge to a point intermediate of its height, horizontal wall portions extending forward from such lower edge at each side of the opening, a vertical plate extending between and overlapping the sides of such opening, a horizontal plate extending between and overlapping the horizontal wall portions a removable bar plate overlying each overlapping vertical and horizontal plate portion, means for tying each horizontal wall portion, the corresponding overlapping plate portion and overlying bar plate together, means for tying each vertical wall portion, corresponding overlapping plate portion and overlying bar plate together, and means for tying the forward ends of the bar plates together, such means comprising a depending portion at the forward end of each horizontal wall portion, a depending portion at the forward end of each bar plate, an inner transverse tie plate bearing at its ends against the inner face of the depending wall portion, an outer tie plate bearing at its ends against the outer face of the depending bar plate portions, and means for securing the inner and outer transverse tie plates to the depending wall portions and the depending bar plate portions.

4. The combination with the locomotive body and the stack, of a vertical wall located at the rear of the stack and having a rectangular central opening extending upward from its lower edge to a point intermediate of its height and having slots at each side of the opening, horizontal wall portions extending forward from such lower edge at each side of the opening, a vertical plate extending between and overlapping the sides of such opening and having slots in the overlapping portions registering with the slots of the wall, a horizontal plate extending between and overlapping the horizontal wall portions, a removable bar plate overlying each overlapping vertical and horizontal plate portion, a projection extending from the bar plate through the registering slots of the vertical wall and vertical plate, means for tying each horizontal wall portion, the corresponding overlapping plate portion and overlying bar plate together, and means for tying each vertical wall portion, corresponding overlapping plate portion and overlying bar plate together.

GEORGE SAMUEL BOYLER.